(12) United States Patent
Vos

(10) Patent No.: US 9,506,405 B2
(45) Date of Patent: Nov. 29, 2016

(54) APPARATUS AND METHOD FOR CONTROLLING POWER GENERATION SYSTEM

(75) Inventor: David W. Vos, Delaplane, VA (US)

(73) Assignee: Rockwell Collins Control Technologies, Inc., Warrenton, VA (US)

( * ) Notice: Subject to any disclaimer, the term of this patent is extended or adjusted under 35 U.S.C. 154(b) by 659 days.

(21) Appl. No.: 13/485,129

(22) Filed: May 31, 2012

(65) Prior Publication Data

US 2012/0239228 A1   Sep. 20, 2012

Related U.S. Application Data

(60) Continuation-in-part of application No. 12/314,672, filed on Dec. 15, 2008, now Pat. No. 8,433,449, which is a division of application No. 11/331,276, filed on Jan. 13, 2006, now Pat. No. 7,854,283, which is a division of application No. 10/051,304, filed on Jan. 22, 2002, now Pat. No. 7,011,498, which is a continuation-in-part of application No. 09/729,457, filed on Dec. 5, 2000, now Pat. No. 6,340,289, which is a continuation of application No. 09/054,411, filed on Apr. 3, 1998, now Pat. No. 6,171,055.

(51) Int. Cl.
*F02C 9/00* (2006.01)
*B60K 6/42* (2007.10)
*F01D 15/02* (2006.01)

(52) U.S. Cl.
CPC . *F02C 9/00* (2013.01); *B60K 6/42* (2013.01); *F01D 15/02* (2013.01); *F05D 2270/051* (2013.01)

(58) Field of Classification Search
None
See application file for complete search history.

(56) References Cited

U.S. PATENT DOCUMENTS

| 2,759,549 A | 8/1956 | Best |
| 2,796,733 A | 6/1957 | Pearl et al. |
| 2,851,855 A | 9/1958 | Gamble |

(Continued)

FOREIGN PATENT DOCUMENTS

| EP | 0 392 965 | 10/1990 |
| FR | 2 386 686 | 11/1978 |
| GB | 1 587 173 | 9/1981 |

OTHER PUBLICATIONS

Office Action mailed Apr. 10, 2000 in U.S. Appl. No. 09/054,411.
(Continued)

*Primary Examiner* — Christopher E Everett
(74) *Attorney, Agent, or Firm* — Finnegan, Henderson, Farabow, Garrett & Dunner LLP

(57) ABSTRACT

A vehicle includes at least one propulsion member and a power generation system. The power generation system includes a power source and a transmission configured to provide torque to the at least one propulsion member. The power generation system further includes a control apparatus comprising an input device and a processor. The processor is configured to receive signals indicative of a power output command, a plurality of detected ambient air conditions, and a plurality of detected power generation system parameters. The processor is also configured to determine a plurality of power generation system control settings for improving efficiency of the vehicle based on at least one of signals indicative of the power output command, the signals indicative of the plurality of detected ambient air conditions, and the signals indicative of a plurality of power generation system parameters.

30 Claims, 9 Drawing Sheets

(56) References Cited

U.S. PATENT DOCUMENTS

| | | |
|---|---|---|
| 2,910,125 A | 10/1959 | Best |
| 3,196,613 A | 7/1965 | Porter et al. |
| 3,289,411 A | 12/1966 | Rogers et al. |
| 3,469,395 A | 9/1969 | Spitsbergen et al. |
| 3,517,509 A | 6/1970 | Bayati |
| 3,523,423 A | 8/1970 | Young |
| 3,719,047 A | 3/1973 | Briotet et al. |
| 3,854,287 A | 12/1974 | Rembold |
| 3,892,975 A * | 7/1975 | Yannone et al. ............ 290/40 R |
| 3,936,226 A | 2/1976 | Harner et al. |
| 3,971,208 A | 7/1976 | Schwent |
| 3,977,187 A | 8/1976 | Guillaume |
| 4,051,669 A * | 10/1977 | Yannone et al. ................ 60/773 |
| 4,159,625 A | 7/1979 | Kerr |
| 4,160,170 A | 7/1979 | Harner et al. |
| 4,161,658 A | 7/1979 | Patrick |
| 4,189,648 A | 2/1980 | Harner |
| 4,242,628 A | 12/1980 | Mohan et al. |
| 4,258,545 A * | 3/1981 | Slater ............................ 60/226.1 |
| 4,275,557 A | 6/1981 | Marvin et al. |
| 4,314,441 A * | 2/1982 | Yannone et al. ........... 60/39.281 |
| 4,335,429 A | 6/1982 | Kawakatsu |
| 4,352,634 A | 10/1982 | Andrews |
| 4,360,871 A | 11/1982 | Blaney |
| 4,400,659 A | 8/1983 | Barron et al. |
| 4,427,897 A | 1/1984 | Migliori |
| 4,437,303 A | 3/1984 | Cantwell |
| 4,499,034 A | 2/1985 | McAllister |
| 4,503,673 A | 3/1985 | Schachle et al. |
| 4,565,929 A | 1/1986 | Baskin et al. |
| 4,686,825 A | 8/1987 | Cavasa et al. |
| 4,692,095 A | 9/1987 | Lawson-Tancred |
| 4,700,081 A | 10/1987 | Kos et al. |
| 4,703,189 A | 10/1987 | DiValentin et al. |
| 4,774,855 A | 10/1988 | Murrell et al. |
| 4,906,060 A | 3/1990 | Claude |
| 4,936,155 A | 6/1990 | Gogins |
| 4,958,289 A | 9/1990 | Sum et al. |
| 5,183,386 A | 2/1993 | Feldman et al. |
| 5,197,280 A | 3/1993 | Carpenter et al. |
| 5,209,640 A | 5/1993 | Moriya |
| 5,256,034 A | 10/1993 | Sultzbaugh |
| 5,303,545 A | 4/1994 | Larkin |
| 5,315,819 A * | 5/1994 | Page ........................ F02C 9/28 416/30 |
| 5,422,826 A | 6/1995 | Cousineau |
| 5,440,490 A | 8/1995 | Summerfield |
| 5,492,189 A | 2/1996 | Kriegler et al. |
| 5,663,600 A | 9/1997 | Baek et al. |
| 5,810,560 A | 9/1998 | Tanaka |
| 5,826,671 A * | 10/1998 | Nakae et al. ............ 180/65.235 |
| 5,867,997 A | 2/1999 | Zachary et al. |
| 5,997,250 A | 12/1999 | Carter, Jr. et al. |
| 6,004,098 A | 12/1999 | Chevallier et al. |
| 6,018,694 A * | 1/2000 | Egami et al. ................. 701/102 |
| 6,026,921 A | 2/2000 | Aoyama et al. |
| 6,072,303 A | 6/2000 | Nickoladze et al. |
| 6,137,187 A | 10/2000 | Mikhail et al. |
| 6,171,055 B1 | 1/2001 | Vos et al. |
| 6,209,672 B1 * | 4/2001 | Severinsky ................ 180/65.23 |
| 6,219,623 B1 | 4/2001 | Wills |
| 6,223,844 B1 | 5/2001 | Greenhill et al. |
| 6,338,391 B1 * | 1/2002 | Severinsky et al. ....... 180/65.23 |
| 6,340,289 B1 | 1/2002 | Vos et al. |
| 6,353,790 B1 | 3/2002 | Tsuzuki |
| 6,379,114 B1 | 4/2002 | Schott et al. |
| 6,420,795 B1 | 7/2002 | Mikhail et al. |
| 6,434,473 B1 | 8/2002 | Hattori |
| 6,554,088 B2 * | 4/2003 | Severinsky et al. ....... 180/65.23 |
| 6,732,521 B2 | 5/2004 | Otake |
| 6,925,361 B1 | 8/2005 | Sinnock |
| 7,104,347 B2 * | 9/2006 | Severinsky et al. ....... 180/65.23 |
| 7,237,634 B2 * | 7/2007 | Severinsky et al. ....... 180/65.23 |
| 7,392,871 B2 * | 7/2008 | Severinsky et al. ....... 180/65.28 |
| 7,455,134 B2 * | 11/2008 | Severinsky et al. ....... 180/65.28 |
| 7,489,990 B2 * | 2/2009 | Fehr et al. .................... 700/291 |
| 7,520,353 B2 * | 4/2009 | Severinsky et al. ....... 180/65.28 |
| 7,597,164 B2 * | 10/2009 | Severinsky et al. ....... 180/65.27 |
| 8,396,643 B2 * | 3/2013 | Nomura et al. .............. 701/103 |
| 8,560,205 B2 * | 10/2013 | Nomura et al. .............. 701/102 |
| 8,639,480 B2 * | 1/2014 | Arnold et al. ..................... 703/2 |
| 2009/0056413 A1 * | 3/2009 | Rao et al. ..................... 73/23.31 |
| 2009/0164048 A1 * | 6/2009 | Kyuma ......................... 700/275 |

OTHER PUBLICATIONS

Office Action mailed May 2, 2001 in U.S. Appl. No. 09/729,457.
Office Action mailed Feb. 3, 2005 in U.S. Appl. No. 10/051,304.
Office Action mailed Feb. 23, 2009 in U.S. Appl. No. 11/331,276.
Office Action mailed Oct. 7, 2009 in U.S. Appl. No. 11/331,276.
Office Action mailed Apr. 23, 2010 in U.S. Appl. No. 11/331,276.
Office Action mailed Jul. 1, 2011 in U.S. Appl. No. 12/314,672.
Office Action mailed Oct. 26, 2011 in U.S. Appl. No. 12/314,672.
Office Action mailed May 29, 2012 in U.S. Appl. No. 12/314,672.
Office Action mailed Sep. 14, 2012 in U.S. Appl. No. 12/314,672.
Office Action mailed Jan. 7, 2015 in U.S. Appl. No. 13/485,129.
Office Action mailed Jul. 15, 2015 in U.S. Appl. No. 13/485,129.
Office Action mailed Dec. 9, 2015 in U.S. Appl. No. 13/485,129.

* cited by examiner

APPARATUS AND METHOD FOR CONTROLLING POWER GENERATION SYSTEM

RELATED APPLICATIONS

This application is a continuation-in-part of U.S. patent application Ser. No. 12/314,672, filed Dec. 15, 2008, which is a divisional of U.S. patent application Ser. No. 11/331,276, filed Jan. 13, 2006, now U.S. Pat. No. 7,854,283, which is a divisional of U.S. patent application Ser. No. 10/051,304, filed Jan. 22, 2002, now U.S. Pat. No. 7,011,498, which is a continuation-in-part of U.S. patent application Ser. No. 09/729,457, filed Dec. 5, 2000, now U.S. Pat. No. 6,340,289, which is a continuation of U.S. patent application Ser. No. 09/054,411, filed Apr. 3, 1998, now U.S. Pat. No. 6,171,055. The entire disclosure of each of U.S. patent application Ser. Nos. 12/314,672, 11/331,276, 10/051,304, 09/729,457, and 09/054,411 is incorporated herein by reference.

FIELD OF THE DISCLOSURE

The present disclosure relates to apparatuses and methods for controlling the output of power generation systems. In particular, the present disclosure relates to apparatuses and methods for controlling the output of power generation systems using a control apparatus.

BACKGROUND

Power generation systems may be used to supply power to various end uses. For example, a power generation system may be used to convert a naturally occurring phenomenon, such as, for example, wind and/or water flow, into electricity. Further, power generation systems may be used to supply power to vehicles, such as, for example, land vehicles, air vehicles, water-borne vehicles, and space vehicles.

The efficiency of power generation systems may depend on a number of conditions that may vary with time. These conditions may include, for example, environmental conditions, such as ambient air conditions, and/or conditions associated with the power generation system, such as power output, among other things. As these conditions change, they may effect the efficiency of the power generation system.

As the price and scarcity of natural resources such as fossil fuels increases, a renewed focus has been placed on finding new power generation systems and/or increasing the efficiency of existing power generation systems. As a result, it may be desirable to improve or optimize the efficiency of power generation systems under changing conditions.

One subject of the invention relates to improving the efficiency of power generation systems. A further subject of the invention relates to improving the efficiency of vehicles having a power generation system. Yet another subject of the invention relates to optimizing the efficiency of power generation systems. Still a further subject of the invention relates to optimizing the efficiency of vehicles including a power generation system. A further subject of the invention relates to providing a single input power control apparatus for controlling the output of power generation systems such that efficiency is improved.

The invention may seek to satisfy one or more of the above-mentioned subjects. Although the present invention may obviate one or more of the above-mentioned subjects, it should be understood that some aspects of the invention might not necessarily obviate them.

SUMMARY OF THE INVENTION

In the following description, certain aspects and embodiments will become evident. It should be understood that the invention, in its broadest sense, could be practiced without having one or more features of these aspects and embodiments. It should be understood that these aspects and embodiments are merely exemplary.

In one aspect, as embodied and broadly described herein, the invention includes a vehicle comprising at least one propulsion member and a power generation system. The power generation system includes a power source and a transmission operably associated with the power source and the at least one propulsion member. The transmission is configured to provide torque to the at least one propulsion member. The power generation system further includes a control apparatus comprising an input device configured to generate signals indicative of a power output command and a processor operably associated with the input device. The processor is configured to receive signals indicative of the power output command, a plurality of detected ambient air conditions, and a plurality of detected power generation system parameters. The processor is also configured to determine a plurality of power generation system control settings for improving efficiency of the vehicle based on at least one of the signals indicative of the power output command, the signals indicative of the plurality of detected ambient air conditions, and the signals indicative of a plurality of power generation system parameters. The processor is further configured to output a plurality of signals corresponding to the plurality of power generation system control settings.

According to yet another aspect, a hybrid electric vehicle includes at least one propulsion member and a power generation system. The power generation system includes a power source and an electric generator operably associated with the power source. The power generation system also includes a transmission operably associated with at least one of the power source and the electric generator. The transmission is configured to provide torque to the at least one propulsion member. The power generation system further includes a control apparatus comprising an input device configured to generate signals indicative of a power output command and a processor operably associated with the input device. The processor is configured to receive signals indicative of the power output command, a plurality of detected ambient air conditions, and a plurality of detected power generation system parameters. The processor is also configured to determine a plurality of power generation system control settings for improving efficiency of the vehicle based on at least one of the signals indicative of the power output command, the signals indicative of the plurality of detected ambient air conditions, and the signals indicative of the detected power generation system parameters. The processor is further configured to output a plurality of signals corresponding to the plurality of power generation system control settings.

According to a further aspect, a method of improving the efficiency of a vehicle comprising a power generation system comprising a power source and a control apparatus includes generating via an input device, a signal indicative of a power output command. The method further includes providing to a processor of the control apparatus, the signal indicative of the power output command, a plurality of signals indicative of detected ambient air conditions, and a plurality of signals indicative of detected power generation system parameters. The method further includes determining via the processor, a plurality of power generation system control settings based on at least one of the signals indicative of the power output command, the signals indicative of the detected ambient air conditions, and the signals indicative of the power generation system parameters. The method also includes outputting signals indicative of the plurality of power generation system control settings, and controlling operation of the power generation system via the signals indicative of the plurality of power generation system control settings.

Aside from the structural and procedural arrangements set forth above, the invention could include a number of other arrangements such as those explained hereinafter. It is to be understood that both the foregoing description and the following description are exemplary only.

BRIEF DESCRIPTION OF THE DRAWINGS

The accompanying drawings are incorporated in and constitute a part of this specification. The drawings illustrate exemplary embodiments and, together with the description, serve to explain some principles of the invention. In the drawings.

DESCRIPTION OF SOME EXEMPLARY EMBODIMENTS

Figure 1:
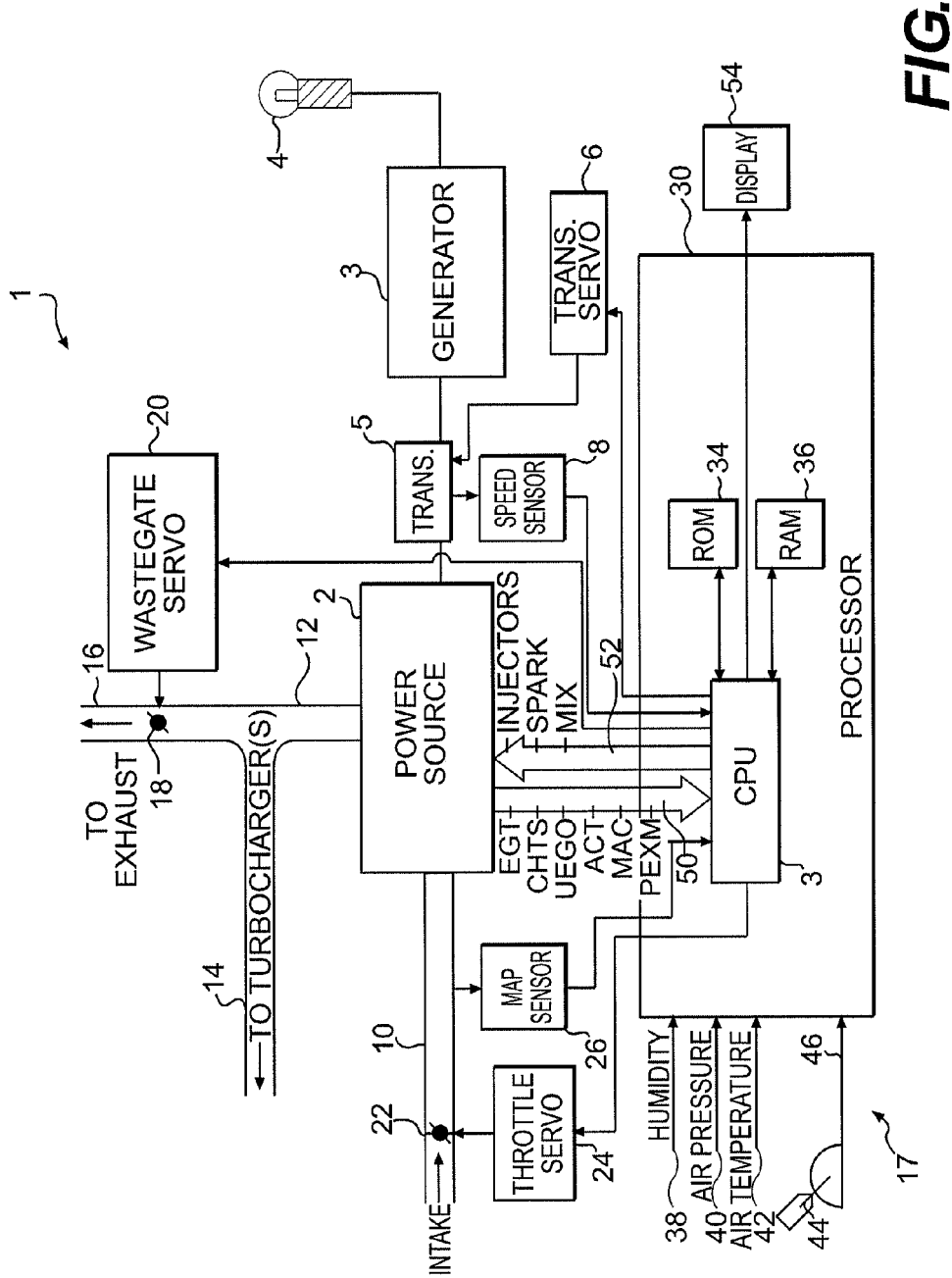
FIG. 1 is a block diagram of an exemplary embodiment of a power generation system.

Reference will now be made in detail to exemplary embodiments of the invention. Wherever possible, the same reference numbers are used in the drawings and the description to refer to the same or like parts.

FIG. 1 depicts an exemplary embodiment of a power generation system 1 for supplying power to a power consuming load 4. The load 4 may be any known electric power consuming system, such as, for example, a utility power grid and/or electric devices such as, for example, electric motor (s) and/or appliances. For example, the load 4 may represent an electric-powered powertrain for manned or unmanned vehicles, such as, for example, water-borne vehicles including submarines, ships, and boats; ground vehicles including cars and trucks; rail vehicles including trains; air vehicles; and space vehicles.

The exemplary power generation system 1 includes a power source 2 configured to convert potential energy into mechanical power. According to some embodiments, power source 2 may be configured to convert potential energy supplied by fuel into rotational power. Power source 2 may be, for example, an internal combustion engine, such as, for example, a two-stroke engine, a four-stroke engine, a spark-ignition engine, a compression-ignition engine, a rotary engine, or a gas turbine engine. The internal combustion engine may be configured to combust fuel, such as, for example, gasoline, diesel fuel, bio-diesel, methanol, ethanol, natural gas, kerosene, aviation fuel, jet fuel, fuel oil, and/or combinations thereof (e.g., E85 (i.e., a blend of 15% gasoline and 85% ethanol)). According to some embodiments, power source 2 may be a fuel cell. According to yet other embodiments, the power source 2 may derive energy from a naturally occurring source, such as, for example, the sun (e.g., via solar cells), the wind, river/stream flow, tidal flow, and ocean currents. Alternatively, or in addition, the power source 2 may include a battery, for example, one or more batteries of a battery-powered vehicle.

According to some embodiments, power source 2 may be operably coupled to a generator 3 configured to convert mechanical power supplied by the power source 2 into electric power. For example, power source 2 may be operably coupled to generator 3 via a transmission 5. The transmission 5 may be configured to provide a coupling between the power source 2 and the generator 3 that results in a constant ratio of input speed to output speed, or the transmission 5 may be configured to provide differing ratios of input speed to output speed. For example, the transmission 5 may include a gear box, which may be selectively operated such that the ratio of the speed of the power source 2's output to the generator 3's input may be changed. According to some embodiments, the transmission 5 may provide discrete ratios by operating the transmission 5 such that different combinations of gears engage one another. According to some embodiments, the transmission 5 may be a continuously-variable transmission.

The power generation system 1 may include a transmission servo 6 configured to change the effective gear ratio of the transmission 5, so that speed of the generator 3 may be changed relative to the speed of the power source 2. For example, the power generation system 1 may be operated such that the power source 2 operates at a selected speed and torque and/or such that the generator 3 may be operated at a speed resulting in the efficiency of the power generation system 1 being improved or optimized. The speed and/or torque of the operation of the power source 2 may be selected such that the power source 2's efficiency is improved or optimized based on, for example, environmental conditions, such as ambient air conditions. Further, the generator 3's speed of operation may be improved or optimized based on, for example, the magnitude of power load placed on the power generation system 1. For example, the efficiency of the power generation system 1 may be improved or optimized by monitoring environmental conditions and selecting set-points for controlling the power source 2's speed and/or the generator 3's output based on known performance responses of the power generation system 1.

According to the exemplary embodiment depicted in FIG. 1, power source 2 includes an intake manifold 10 and an exhaust manifold 12. The exhaust manifold 12 may be in flow communication with a conduit 16 configured to provide a path for gases generated during the combustion process to be evacuated from the power source 2 to the surroundings.

According to some embodiments, the exhaust manifold 12 may be in flow communication with a conduit configured to supply at least a portion of the gases generated during the combustion process to one or more turbochargers (not shown). The turbocharger(s) may be configured to increase the manifold air pressure (MAP). The exhaust manifold 12 may be in flow communication with a wastegate valve 18 configured to control the portion of exhaust gases that flow to the turbocharger(s) via conduit 14 instead of to the surroundings via conduit 16. According to some embodiments, operation of the wastegate valve 18 may be controlled via a wastegate servo 20, such that the portion of the exhaust gases flowing via conduit 16 to the surroundings may be changed, which, in turn, controls the portion of the exhaust gases supplied to the turbocharger(s). For example, the wastegate servo 20 may be configured to control the position of the wastegate valve 18 in response to feedback from a measured intake manifold air pressure (MAP).

According to some exemplary embodiments, a movable throttle valve 22 may be associated with the intake manifold 10, as depicted in FIG. 1. The throttle valve 22 may be controlled via, for example, a throttle servo 24. The power generation system 1 may include a manifold air pressure (MAP) sensor 26 configured generate a signal indicative of the intake MAP.

The exemplary power generation system 1 includes a control apparatus 17 (e.g., a single lever power controller). The control apparatus 17 includes a processor 30 configured to receive signals indicative of an operator's commanded power output, signals indicative of environmental conditions (e.g., ambient air conditions), and/or signals indicative of various parameters associated with the power generation system 1, and determine one or more control settings for improving or optimizing the efficiency of the power generation system 1. According to some embodiments, the processor 30 may include a full authority digital electronic control (FADEC). For example, the processor 30 may include a central processing unit (CPU) 32, read only memory (ROM) 34, and/or random access memory (RAM) 36. According to some embodiments, the processor 30 may be a 16-bit micro-processor based on, for example, an INTEL 8096 microprocessor (e.g., a microprocessor used in previous generations of FORD engine electronic control units). The FADEC may be configured to meter fuel and control fuel injection, for example, via a speed-density method, and the FADEC may include a distributorless electronic ignition having a double-fire capacity. According to some embodiments, the processor 30 may be housed within a sealed enclosure and/or may be cooled via air and/or liquid cooling, for example, for high altitude applications.

According to some exemplary embodiments, the processor 30 may include one or more single input power controller (SIPC) algorithms. For example, the control apparatus 17 may include a single input device 44, such as, for example, a lever or pedal. The SIPC algorithm(s) may be configured to permit control of the power output of the power generation system 1 via the operation of the single input device 44, which sends signals indicative of an operator's commanded power output to the processor 30. The processor 30, based on the signals indicative of commanded power output, may determine control settings for various components of the power generation system 1 and send control signals to the various components such that the settings are implemented. For example, the processor 30 may determine control settings for the power source 2, the generator 3, the transmission 5, the transmission servo 6, the turbocharger(s), the wastegate valve 18, the wastegate servo 20, the throttle valve 22, the throttle servo 24, the ignition, the air-fuel mixture, the fuel injection timing and/or the amount of fuel injected, and/or the timing and/or duration of the opening and closing of the intake valves and/or exhaust valves of the power source 2. For example, the processor 30 may determine control settings for the power source 2, such as, for example, power source speed and/or manifold air pressure commands.

The SIPC algorithm(s) may be in the form of digital information stored in computer software and/or hardware incorporated into the processor 30. For example, the SIPC algorithm(s) may be stored in software integrated into the processor 30, for example, as one or more subroutines of the FADEC. The SIPC subroutine(s) may be configured to receive signals indicative environmental conditions, and signals indicative of operating parameters associated with the power source 2 and/or the generator 3, and the commanded power output. The SIPC subroutine(s) may also (or alternatively) be configured to perform the SIPC algorithm(s), and to output control settings, for example, at the end of each control cycle.

The processor 30 may be configured to receive information relating to the environmental conditions present during operation of the power generation system 1. For example, the processor 30 may receive signals indicative of the ambient air conditions, such as, for example, the wind velocity, the humidity 38, the static and/or dynamic air pressure 40, and/or the air temperature 42. The processor 30 may also be configured to receive information relating to the operation of the power source 2. For example, the processor 30 may receive signals from various sensors related to the operating parameters associated with the power source 2, such as, for example, signals indicative of an engine speed from an engine speed sensor 8 and/or the MAP from the MAP sensor 26. According to some embodiments, the processor 30 may be configured to receive signals indicative of exhaust gas temperature (EGT), cylinder head temperature (CHT), universal exhaust gas oxygen (UEGO), air charge temperature (ACT), mass airflow (MAF), and/or exhaust pressure (PEXH). The processor 30 may be configured to receive a signal indicative a commanded power output from, for example, the single input device 44 via an electric link 46. The above-mentioned signal(s) may be received by processor 30 via a bus 50, for example, as shown in FIG. 1, and/or via wireless transmission. According to some embodiments, these signals may include, for example, analog signals, which may range between about −10 volts and about +10 volts (e.g., between about −5 volts and about 5 volts), and/or these signals may be in the form of digital signals.

According to some exemplary embodiments, the processor 30 is configured to receive one or more of the above-mentioned signals and provide control signals to one or more of the throttle servo 22, the transmission servo 5, and the wastegate servo 20. For example, the CPU 3 may provide control signals to one or more of the throttle servo 22, the transmission servo 6, and the wastegate servo 20, as depicted in FIG. 1.

According to some exemplary embodiments, the processor 30 may also be configured to provide control signals to control, for example, the turbocharger(s), the ignition timing (e.g., the spark timing for a spark ignition engine), the air-fuel mixture, the fuel injection timing and/or the amount of fuel injected, and/or the timing and/or duration of the opening and closing of the intake valves and/or exhaust valves of the power source 2. The control signals may be carried via a bus 52, and/or via a wireless link. According to some embodiments, the control signals may be in the form of analog signals ranging from about 0 volts to about 5 volts, and/or the control signals may be in the form of digital signals.

The power generation system 1 may include a display 54 operably coupled to the processor 30, and the display 54 may be configured to display information relating to the operation of the power generation system 1, such as, for example, a desired MAP setting and/or a desired generator speed setting. For example, according to some embodiments, the processor 30 may determine settings for improving or optimizing the efficiency of the power generation system 1, and the processor 30 may display to an operator one or more of those settings via the display 54. For example, the display 54 may display an MAP setting, a generator speed setting, and/or a throttle servo setting. The operator may be provided with controls that enable the operator to manually supply control signals to one or more of the various controllable components of the power generation system 1, such that one or more of the processor-determined settings may be achieved. According to some embodiments, for example, as outlined previously, the processor 30 may automatically supply control signals to one or more of the various controllable components of the power generation system 1, such that one or more of the processor-determined settings may be achieved.

Figure 2:
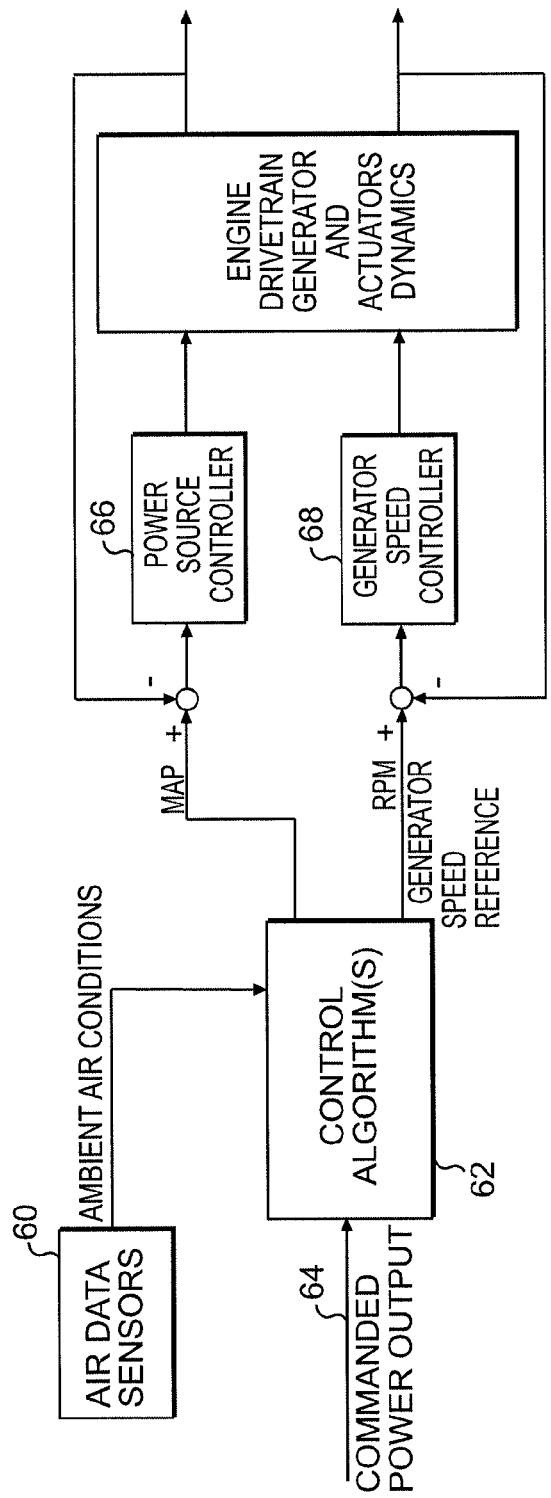
FIG. 2 is a functional block diagram of the exemplary embodiment of FIG. 1.

FIG. 2 is a block diagram showing the function of an exemplary embodiment of the power generation system 1. In the exemplary embodiment, the processor 30 receives signals indicative of detected environmental conditions along with a signal indicative of a commanded power output of the power generation system 1. For example, the detected environmental conditions may be detected via one or more air data sensors 60, and the commanded power level 64 may be received from the single input device 44 (see, e.g., FIG. 1). These signals may be received by, for example, a FADEC of the processor 30. Upon receipt of these signals, the processor 30 may use the SIPC algorithm(s) to access one or more look-up tables and/or maps stored in the ROM 34 and/or RAM 36. The look-up tables and/or maps may provide control settings, for example, a power source speed command, an MAP command, and/or a generator speed command, which may result in improved or optimized efficiency of the power output of the power generation system 1 based at least partially on the signals indicative of detected environmental conditions and/or the commanded power output. Instead of (or in addition to) look-up tables and/or maps, the processor 30 may determine the control settings via real-time calculations via mathematical relationships, such as theoretically and/or empirically-derived equations, which may be accessed by the processor 30.

According to some embodiments, the SIPC algorithm(s), the look-up tables, maps, and/or mathematical equations may be supplied to the processor 30 via one or more digital storage devices, such as disks, memory cards, memory sticks, and/or flash drives. According to some embodiments, the SIPC algorithm(s), look-up tables, maps, and/or mathematical equations may be provided via a separate computer, for example, via a physical link and/or wireless link. According to some embodiments, the computer may provide an operator with advisory messages in addition to or in lieu of providing control signals to the power generation system 1 to activate the control servos and other controllable components of the power generation system 1.

According to the exemplary embodiment depicted in FIG. 2, the power generation system 1 (i.e., the processor 30) monitors signals received from the air data sensors 60. The signals may be supplied to one or more control algorithms 62, which may be configured to determine a combination of the power source 2's operating speed, the power source 2's power output or load setting, and/or the generator 3's operating speed to improve or optimize the power output efficiency of the power generation system 1. For example, the power source 2's operating speed, the power source 2's power output or load setting, and/or the generator 3's operating speed may be determined such that the maximum efficiency of the combined power source 2 and generator 3 is achieved for the detected environmental conditions.

During operation according to some embodiments, an operator of the power generation system 1 supplies a commanded power output 64 (e.g., a percentage of the total available power output of the power generation system 1) via operation of the single input device 44 (see, e.g., FIG. 1). The control algorithm(s) (e.g., subroutine(s) running in the FADEC) receive the commanded power output level and generate a signal indicative of a MAP set-point, which, in turn, is received by a power source controller 66. The power source controller 66, according to some embodiments, supplies a signal that serves to operate the throttle servo 24 and/or the wastegate servo 20 (see, e.g., FIG. 1) to achieve an inlet MAP corresponding to the operator's commanded power output level. According to some embodiments if which power source 2 does not include a turbocharger, the power source controller 66 transmits a signal that serves to operate the throttle servo 24 alone to achieve an inlet MAP corresponding to the operator's commanded power output level. The control algorithm(s) 62 may also be configured to output a generator speed set-point, which may be received by a generator speed controller 68. The generator speed controller 68 may be configured to operate the transmission servo 6, such that the transmission 5 provides a gear ratio resulting in a generator speed that substantially matches the generator speed set-point. The operating speed of the generator 3 may be sensed via a speed sensor 8 operably coupled to the transmission 5.

According to some exemplary embodiments, the control algorithm(s) 62 may use signals from the single input device 44 to determine the MAP and engine speed that will improve or optimize efficiency of the power output at the commanded power output level (e.g., via interpolation of data found in look-up tables and/or maps stored in the ROM 34 and/or RAM 36).

The power output and/or specific fuel consumption of the power source 2 may be controlled by at least two primary variables, such as, for example, MAP and engine speed. The power output and specific fuel consumption of the power source 2 are related to MAP and engine speed, and those relationships may be determined via testing and/or may be predicted. The relationships between power output, specific fuel consumption, MAP, and/or engine speed may be incorporated into look-up tables and/or maps, and/or may be characterized by mathematical equations. Operation of the generator 3 may be characterized by a power coefficient and efficiency in relation to advance ratio, which, in turn, are functions of generator speed, density, and load on the generator. The relationships between the generator 3's power coefficient, efficiency, advance ratio, generator speed, density, and load may be incorporated into look-up tables and/or maps, or may be characterized by mathematical equations. According to some embodiments, the processor 30 may include one or more algorithms configured to improve or optimize the power generation system 1's efficiency based on one or more of the relationships between the power source 2's power output, specific fuel consumption, MAP, and engine speed, and/or one or more of the relationships between the generator 3's power coefficient, efficiency, advance ratio, generator speed, density, and load.

According to some embodiments, output of the processor 30's algorithm(s) is a set of engine speed and MAP data, which correspond to the environmental conditions and commanded power outputs. These data may be stored in the processor 30 (e.g., in the FADEC) in look-up table and/or map form. The data may be supplied directly from the look-up tables and/or maps and/or may be interpolated to obtain engine speed and/or MAP settings for rendering improved or optimum efficiency of power source 2 corresponding to a given set of environmental conditions and commanded power output.

Figure 3:
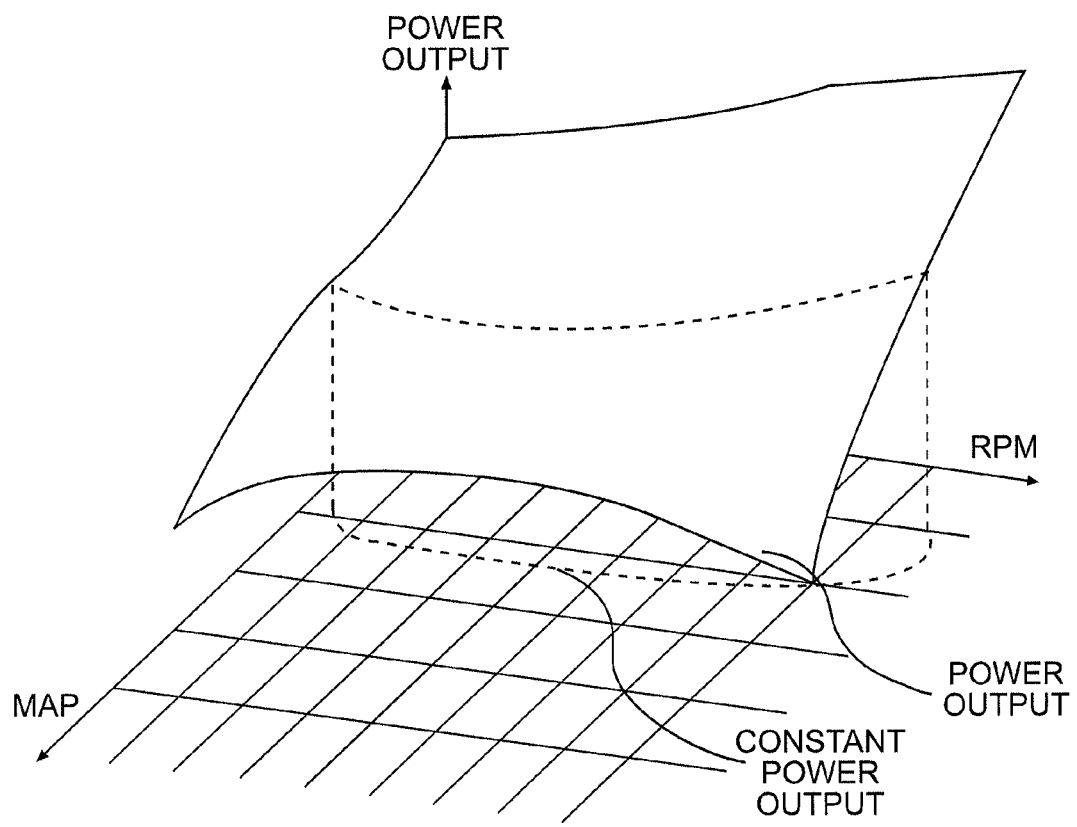
FIG. 3 is a schematic, three-dimensional contour map of output power, manifold air pressure (MAP), and engine speed in revolutions per minute (RPM) for an exemplary embodiment of power generation system.

FIG. 3 schematically depicts an exemplary constant power output contour for an exemplary operator-commanded power output and detected ambient air conditions. The constant power output contour is projected onto an engine speed (RPM) and MAP plane, which is depicted in a horizontal orientation. For this example, the constant power output contour is represented by a series of points located in the RPM-MAP plane.

Figure 4:
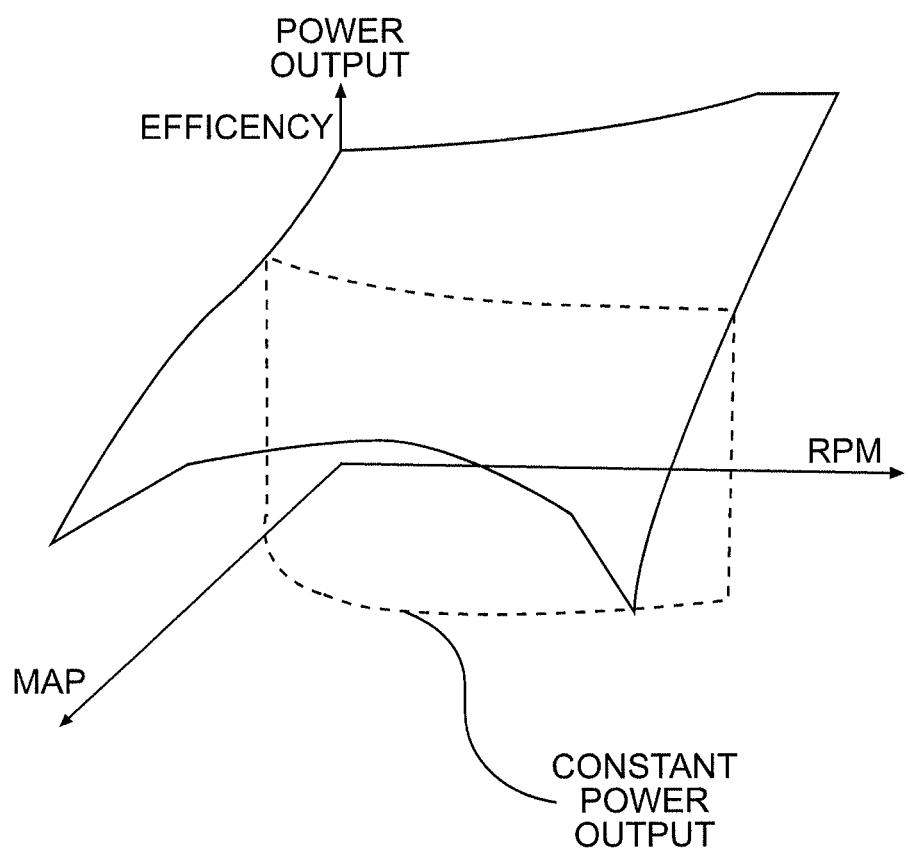
FIG. 4 is a schematic, three-dimensional contour map of output power, MAP, and RPM for an exemplary power generation system.

FIG. 4 schematically depicts engine speed and MAP pairs projected onto a power output efficiency surface. The power output contour is projected onto the efficiency surface, and operation of the power source is described by a 3-dimensional curve.

Figure 5:
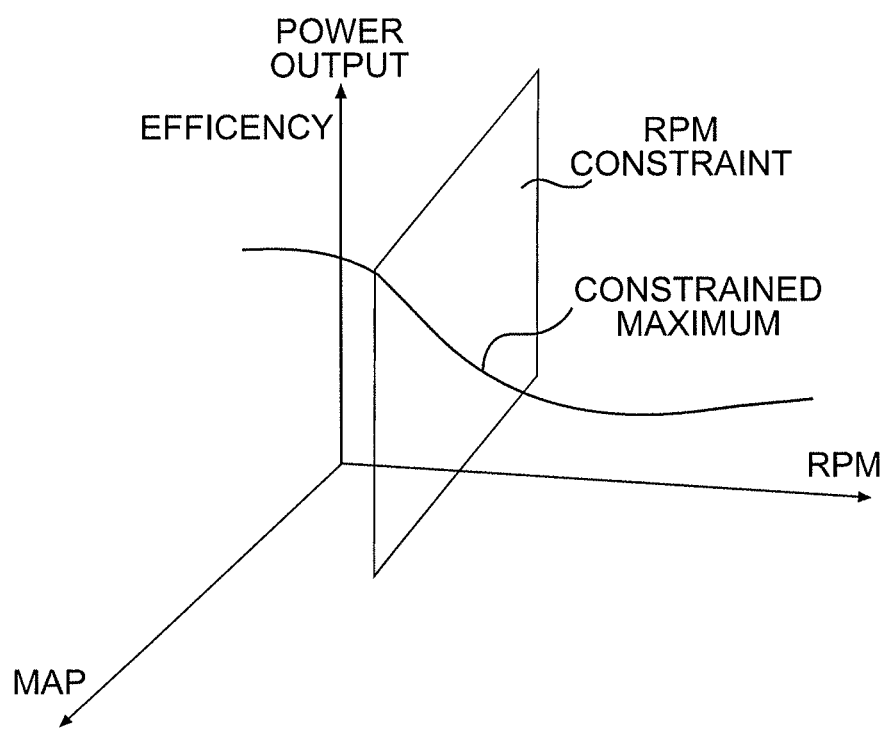
FIG. 5 is a schematic, three-dimensional contour map of output power, MAP, and RPM for an exemplary power generation system.

FIG. 5 schematically depicts a maximum power output efficiency plane. The maximum power output efficiency may be constrained for safety and/or other operating considerations. For example, a safe-operating envelope may be imposed on the projected power output efficiency curve in order to yield maximum engine speed and/or maximum MAP set points, in the interest of, for example, preserving the reliability of components of the power generation system 1.

According to some embodiments, the processor 30 is configured to determine engine speed and/or MAP targets for achieving a desired power output based on MAP and engine speed data in look-up tables and/or maps stored in the ROM 34 and/or RAM 36, such that the efficiency of the power generation system 1 is improved or optimized for a set of environmental conditions. This data may be obtained via experimentation with models or via theoretical calculation to establish a base-line data set.

According to some embodiments, the processor 30 may include one or more algorithms configured to adaptively update the base-line data set based on actual performance of the power generation system 1. For example, the processor 30 may initially operate the power generation system 1 according the base-line data set and monitor in real-time the efficiency of the power generation system 1. The processor 30 may be configured to determine new data sets for operating the power generation system 1 in manner that yields higher operating efficiency. As the processor 30 determines new data sets corresponding to improved efficiency, the look-up tables and/or maps may be updated to reflect the new data sets. Adaptive algorithm(s) may be configured to fine tune the base-line data sets to improve or optimize the efficiency of the power generation system 1 by, for example, regularly or continually making minor adjustments in operating parameters in search of improved or optimum efficiency in real-time. By operating in this fashion, the adaptive algorithm(s) may also serve to account or correct for wear in the power generation system 1's components and/or for differences in replacement components.

According to some embodiments, the power generation system 1 may be incorporated into a vehicle 100. According to the exemplary embodiment schematically-depicted in FIG. 6, for example, the vehicle 100 may be a water-borne vehicle including submarines, ships, and boats; a ground vehicle including cars and trucks; a rail vehicle including trains; an air vehicle; and a space vehicle. The vehicle 100 may be a manned or unmanned vehicle.

Figure 6:
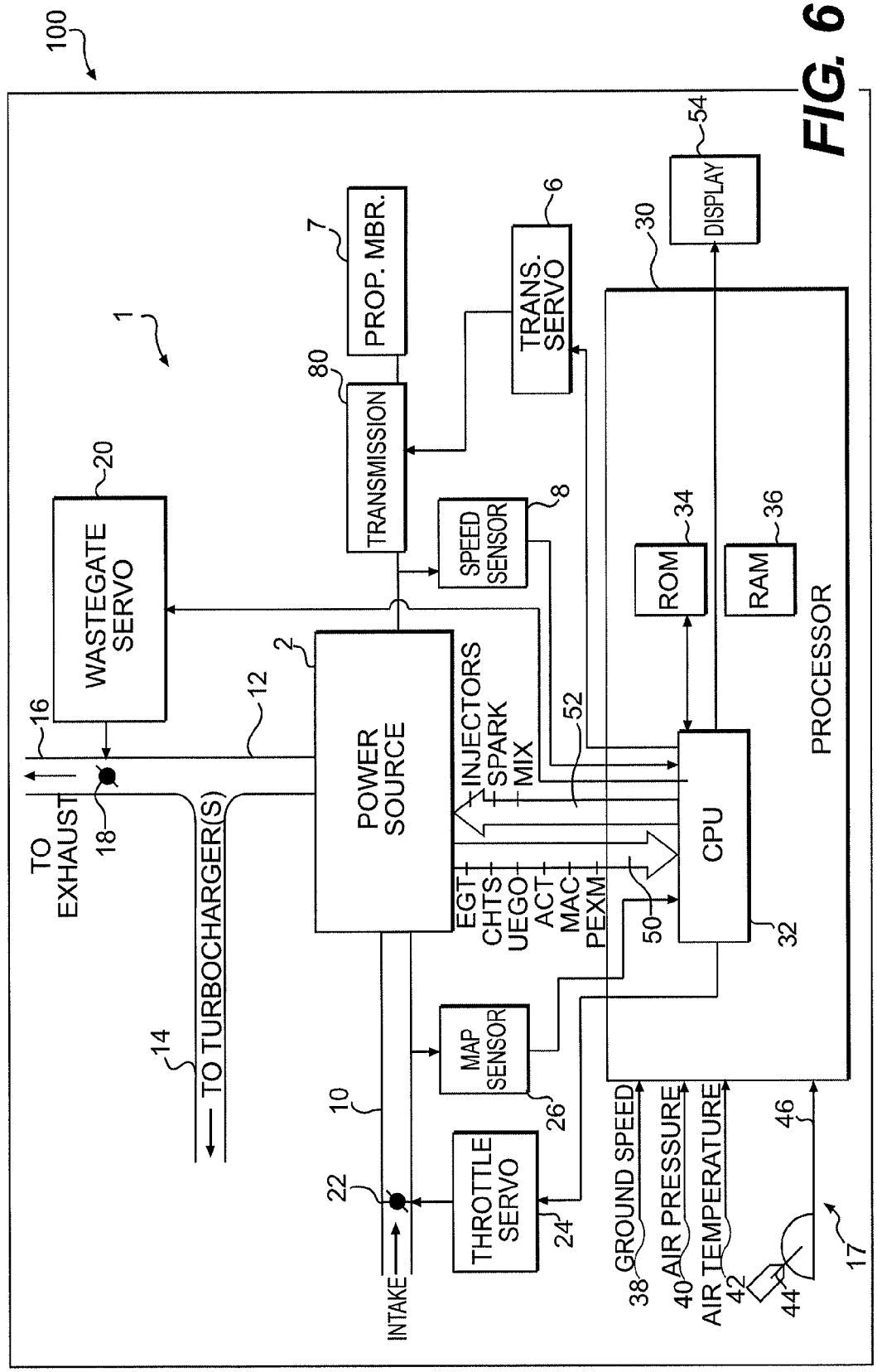
FIG. 6 is block diagram of an exemplary embodiment of a vehicle including an exemplary power generation system.

The exemplary vehicle 100 schematically-depicted in FIG. 6 may include a power generation system 1 for supplying power to a propel the vehicle 100 and/or provide power to various electrically-powered components of the vehicle 100. The exemplary power generation system 1 includes a power source 2 configured to convert potential energy into mechanical power. For example, power source 2 may be configured to convert potential energy supplied by fuel into rotational power. Power source 2 may be, for example, an internal combustion engine, such as, for example, a two-stroke engine, a four-stroke engine, a spark-ignition engine, a compression-ignition engine, a rotary engine, and/or a gas turbine engine. The internal combustion engine may be configured to combust fuel, such as, for example, gasoline, diesel fuel, bio-diesel, methanol, ethanol, natural gas, kerosene, aviation fuel, jet fuel, fuel oil, and/or combinations thereof (e.g., E85 (i.e., a blend of 15% gasoline and 85% ethanol)). According to some embodiments, the power source 2 may be solar-powered and/or fuel cell-powered. Alternatively, or in addition, the power source 2 may include a battery, for example, one or more batteries of a battery-powered vehicle.

According to some embodiments, the power source 2 may be operably coupled one or more propulsion members 7 (e.g., one or more wheels, propellers, and/or fans) configured to propel the vehicle 100 via a drive-line transmission 80. The drive-line transmission 80 may be configured to provide differing ratios of input speed of the power source 2 to the output speed of the drive-line transmission 80. For example, the drive-line transmission 80 may include a gear box, which may be selectively operated such that the ratio of the speed of the power source 2's output to the drive-line transmission 80's output may be changed. According to some embodiments, the drive-line transmission 80 may provide discrete gear ratios by operating the drive-line transmission 80 such that different combinations of gears engage one another. According to some embodiments, the drive-line transmission 80 may be a continuously-variable transmission.

The power generation system 1 may include a transmission servo 6 configured to change the gear ratio of the drive-line transmission 80, so that speed of the propulsion member(s) 7 may be changed relative to the speed of the power source 2. For example, the power generation system 1 may be operated such that the power source 2 operates at a speed and torque and/or such that the drive-line transmission 80 may be operated at a gear ratio such that the efficiency of the power generation system 1 is improved or optimized. The speed and/or torque of the operation of the power source 2 may be chosen such that it's efficiency is improved or optimized based on, for example, environmental conditions, such as ambient air conditions. Further, the gear ratio of the drive-line transmission 80 may be selected based on the speed of the power source 2 and the desired speed of the vehicle 100, such that the efficiency of the power generation system 1 is improved or optimized. For example, the efficiency of the power generation system 1 may be improved or optimized by monitoring environmental conditions and selecting set-points for controlling the power source 2's speed and/or the drive-line transmission 80's gear ratio based on known performance responses of the power generation system 1.

The exemplary vehicle 100 may include a control apparatus 17 (e.g., a single lever power controller). The control apparatus 17 includes a processor 30 configured to receive signals indicative of an operator's commanded power output, signals indicative of environmental conditions (e.g., ambient air conditions), and/or signals indicative of various parameters associated with the power generation system 1, and determine one or more control settings for improving or optimizing the efficiency of the vehicle 100's power generation system 1. For example, the vehicle 100 may include a processor 30 at least similar to the exemplary processors 30 described previously herein.

Similar to the exemplary embodiments of power generation system 1 of FIGS. 1-5, the exemplary processor 30 of vehicle 100 may include one or more single input power controller (SIPC) algorithms as described previously herein. For example, the processor 30 may determine control settings for the power source 2, the drive-line transmission 80, the transmission servo 6, the turbocharger(s), the wastegate valve 18, the wastegate servo 20, the throttle valve 22, the throttle servo 24, the ignition, the air-fuel mixture, the fuel injection timing and/or the amount of fuel injected, and/or the timing and/or duration of the opening and closing of the intake valves and/or exhaust valves of the power source 2. Furthermore, the SIPC algorithm(s) may be in the form of digital information stored in computer software and/or hardware incorporated into the processor 30. The processor 30 may be configured to receive signals indicative of environmental conditions, signals indicative of operating parameters associated with the power source 2 and/or the drive-line transmission 80, and the commanded power output. The processor 30 may also be configured to perform the SIPC algorithm(s) and output control settings, for example, at the end of each control cycle.

Figure 7:
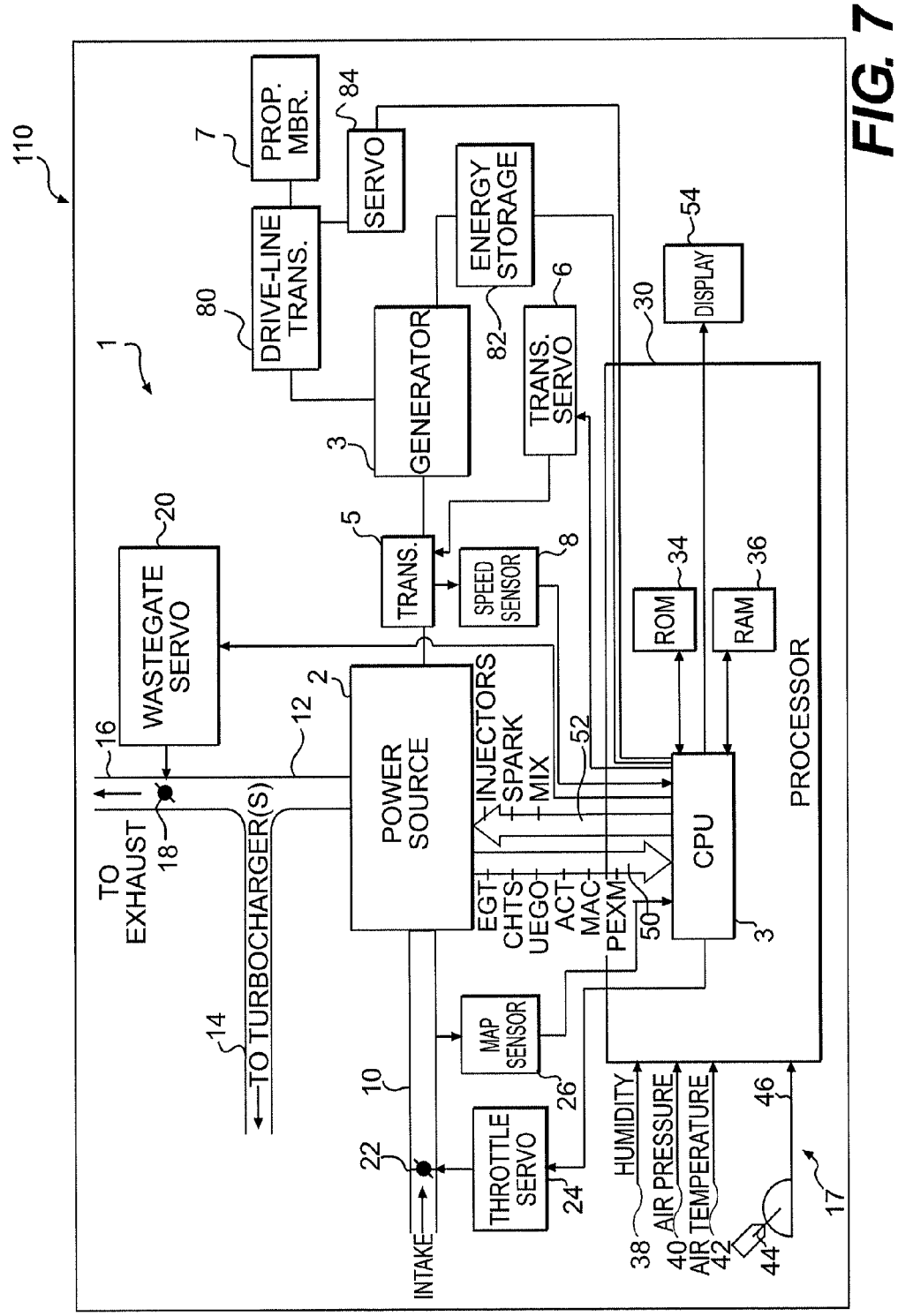
FIG. 7 is a block diagram of a further exemplary embodiment of a vehicle including an exemplary power generation system.

According to some embodiments, the power generation system 1 may be incorporated into a hybrid vehicle 110, as schematically-depicted in FIG. 7. The hybrid vehicle 110 may be a water-borne vehicle including submarines, ships, and boats; a ground vehicle including cars and trucks; a rail vehicle including trains; an air vehicle; and a space vehicle. The vehicle 110 may be a manned or unmanned vehicle. For example, the hybrid vehicle 110 may include a power generation system 1 for supplying power to one or more propulsion members 7 (e.g., one or more wheels, propellers, and/or fans) configured to propel the hybrid vehicle 110 and/or provide power to various electrically-powered components of the hybrid vehicle 110.

The exemplary hybrid vehicle 110 includes a power generation system 1 having a power source 2 configured to convert potential energy into mechanical power. For example, power source 2 may be configured to convert potential energy supplied by fuel into rotational power. Power source 2 may be, for example, an internal combustion engine, such as, for example, a two-stroke engine, a four-stroke engine, a spark-ignition engine, a compression-ignition engine, a rotary engine, or a gas turbine engine. The internal combustion engine may be configured to combust fuel, such as, for example, gasoline, diesel fuel, bio-diesel, methanol, ethanol, natural gas, kerosene, aviation fuel, jet fuel, fuel oil, and/or combinations thereof (e.g., E85 (i.e., a blend of 15% gasoline and 85% ethanol)). According to some embodiments, the power source 2 may be solar-powered and/or fuel cell-powered. Alternatively, or in addition, the power source 2 may include a battery, for example, one or more batteries of a battery-powered vehicle.

The power source 2 may be operably coupled to a generator 3 configured to convert mechanical power supplied by the power source 2 into electric power. For example, power source 2 may be operably coupled to generator 3 via a transmission 5. The transmission 5 may be configured to provide a coupling between the power source 2 and the generator 3 that results in a constant ratio of input speed to output speed, or the transmission 5 may be configured to provide differing ratios of input speed to output speed. For example, the transmission 5 may include a gear box, which may be selectively operated such that the ratio of the speed of the power source 2's output to the generator 3's input may be changed. According to some embodiments, the transmission 5 may provide discrete ratios by operating the transmission 5 such that different combinations of gears engage one another. According to some embodiments, the transmission 5 may be a continuously-variable transmission.

The power generation system 1 may include a transmission servo 6 configured to change the effective gear ratio of the transmission 5, so that speed of the generator 3 may be changed relative to the speed of the power source 2. For example, the power generation system 1 may be operated such that the power source 2 operates at a speed and torque and/or such that the generator 3 may be operated at a speed such that the efficiency of the power generation system 1 is improved or optimized. The speed and/or torque of the operation of the power source 2 may be selected such that the power source 2's efficiency is improved or optimized based on, for example, ambient air conditions. Further, the generator 3's speed of operation may be optimized based on, for example, the amount of power load placed on the power generation system 1. For example, the efficiency of the power generation system 1 may be improved or optimized by monitoring environmental conditions and selecting setpoints for controlling the power source 2's speed and/or the generator 3's output based on known performance responses of the power generation system 1.

According to some embodiments of the hybrid vehicle 110, the generator 3 may be operably coupled to a drive-line transmission 80, and the power source 2 supplies the generator 3 with mechanical power. According to some embodiments, the power source 2 is not coupled to the drive-line transmission 80 such that mechanical power is supplied to the drive-line transmission 80. Rather, the power source 2 provides mechanical power solely to the generator 3. This type of arrangement is sometimes referred to as a "series hybrid" configuration.

According to some embodiments, the drive-line transmission 80 may be a continuously-variable transmission, which includes one or more electric motors operably coupled to the generator 3 and the propulsion member(s) 7 of the hybrid vehicle 110. For example, the drive-line transmission 80 may include an electric motor (not shown) operably coupled to a differential and drive shafts (not shown), which in turn, are operably coupled to the propulsion member(s) 7. According to some embodiments, the drive-line transmission 80 may include two or more electric motors 80, each operably coupled to a propulsion member 7 of the hybrid vehicle 110. According to some embodiments, the drive-line transmission 80 may include one or more electric motors (not shown) operably coupled a gear box (not shown) configured to provide differing ratios between the speed of the electric motor output shaft(s) and the input shaft of the gear box. The gear box is operably coupled to one or more propulsion members 7 of the hybrid vehicle 110 (e.g., via a differential and drive shaft(s)). According to some embodiments, the gear box of the drive-line transmission 80 may provide discrete gear ratios by engaging different combinations of gears. According to these embodiments, the one or more electric motors may be operated, for example, at a relatively constant speed, and the hybrid vehicle 110 may be operated at different speeds via changing the effective gear ratio of the gear box, which may be a continuously-variable transmission.

According to some embodiments, the hybrid vehicle 110 may include an energy storage device 82, such as one or more batteries and/or capacitors. For example, the energy storage device 82 may be configured to store excess electric energy generated by the generator 3. The stored energy may be used, for example, by the electric motor(s) of the drive-line transmission 80, for example, when more electric power is desired for propelling the hybrid vehicle 110 and/or to improve or optimize efficiency of the power generation system 1 of the hybrid vehicle 110.

The power generation 1 system may include a drive-line transmission servo 84 configured to change the effective gear ratio of the gear box of the drive-line transmission 80. For example, the power generation system 1 may be operated such that the power source 2 operates at a speed and torque and/or such that the gear box of the drive-line transmission 80 provides an effective gear ratio for improving and/or optimizing the efficiency of the power generation system 1 at a desired power output and/or vehicle speed. The speed and/or torque of the operation of the power source 2 may be selected such that the power source 2's efficiency is improved and/or optimized based on, for example, ambient air conditions. Further, the drive-line transmission 80's effective gear ratio may be optimized based on, for example, the amount of power load placed on the power generation system 1. For example, the efficiency of the power generation system 1 may be improved or optimized by monitoring environmental conditions and selecting set-points for controlling the power source 2's speed and/or the drive-line transmission 80's effective gear ratio based on known performance responses of the power generation system 1.

The exemplary hybrid vehicle 110 shown in FIG. 7 includes a control apparatus 17 (e.g., a single lever power controller). The control apparatus 17 includes a processor 30 configured to receive signals indicative of an operator's commanded power output, signals indicative of environmental conditions (e.g., ambient air conditions), and/or signals indicative of various parameters associated with the components of the hybrid vehicle 110's power generation system 1. Based on these signals, the processor 30 determines one or more control settings for the components of the power generation system 1 for improving or optimizing the efficiency of the power generation system 1. For example, the hybrid vehicle 110 may include a processor 30 at least similar to the exemplary processors 30 described previously herein.

Similar to the exemplary embodiments of power generation system 1 of FIGS. 1-5, the exemplary processor 30 of the hybrid vehicle 110 may include one or more single input power controller (SIPC) algorithms as described previously herein. For example, the processor 30 may determine control settings for the components of the power generation system 1, such as, for example, the power source 2, the generator 3, the transmission servo 6, the energy storage device 82, the drive-line transmission 80 (including the one or more electric motors and gear box), the transmission servo 6, the drive-line transmission servo 84, the turbocharger(s), the wastegate valve 18, the wastegate servo 20, the throttle valve 22, the throttle servo 24, the ignition, the air-fuel mixture, the fuel injection timing and/or the amount of fuel injected, and/or the timing and/or duration of the opening and closing of the intake valves and/or exhaust valves of the power source 2. Furthermore, the SIPC algorithm(s) may be in the form of digital information stored in computer software and/or hardware incorporated into the processor 30. The processor 30 may be configured to receive signals indicative environmental conditions, signals indicative of operating parameters associated with the components of the power generation system 1, and signals indicative of the commanded power output. Based on these signals, the processor performs the SIPC algorithm(s), and outputs control settings for the components of the power generation system 1, for example, at the end of each control cycle.

Figure 8:
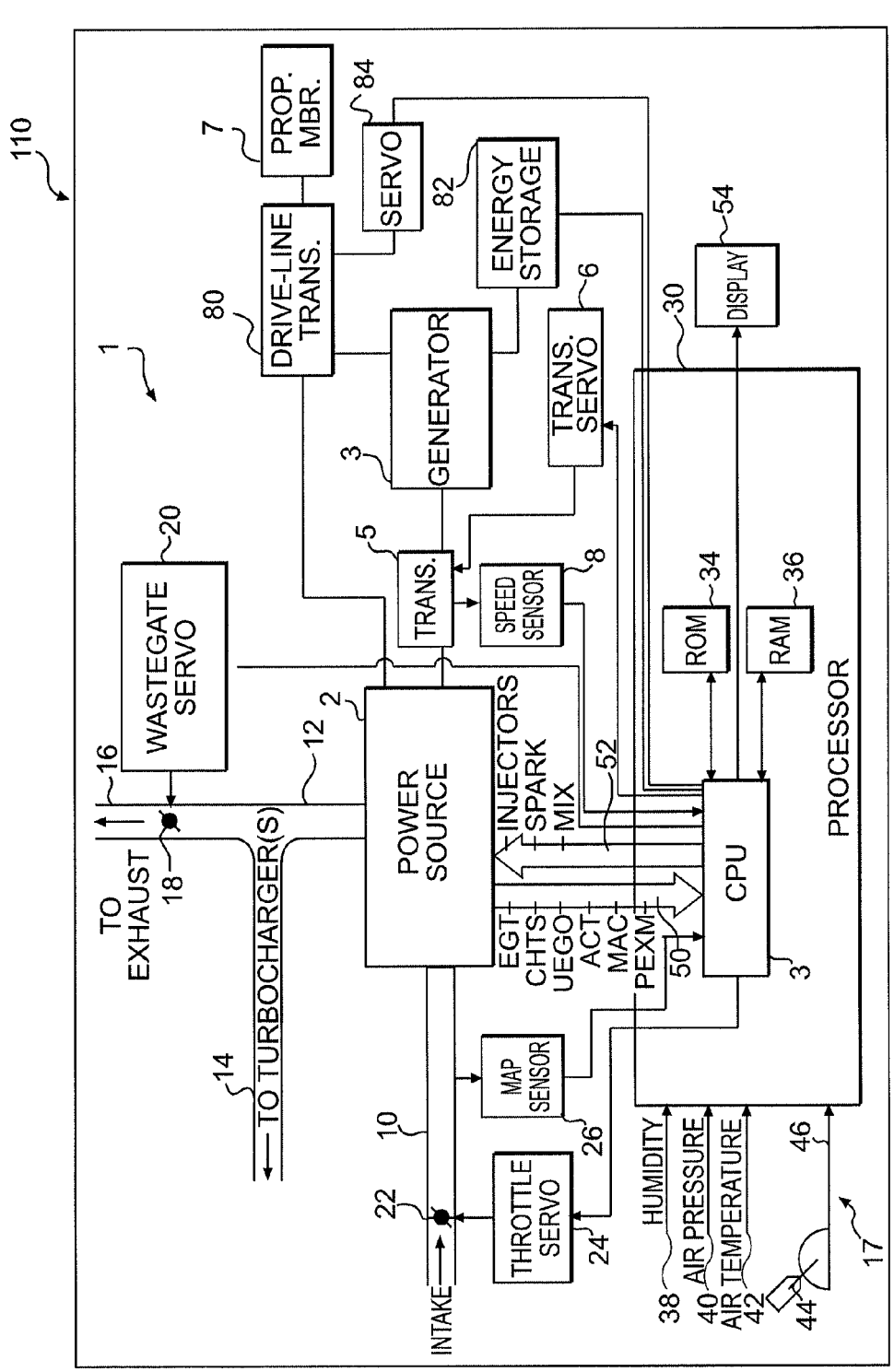
FIG. 8 is a block diagram of another exemplary embodiment of a vehicle including an exemplary power generation system.

According to some embodiments of the hybrid vehicle 110, for example, as schematically-depicted in FIG. 8, the power source 2 may be operably coupled to the drive-line transmission 80 and the generator 3 via mechanical links, such that the power source 2 may selectively supply mechanical power to each of the drive-line transmission 80 and the generator 3. Such a configuration is sometimes referred to as a "parallel hybrid" configuration. The drive-line transmission 80 may include one or more electric motors (not shown) and/or a gear box (not shown) in a similar manner as described previously herein with reference the exemplary embodiment of FIG. 7. According to some embodiments, the power source 2 and the electric motor(s) may be configured to selectively operate independent of one another and/or in a complimentary manner to provide power to the drive-line transmission 80's gear box, such that the hybrid vehicle 110 may be propelled via one or more propulsion members 7, according to an operator's commanded power output.

The exemplary hybrid vehicle 110 shown in FIG. 8 includes a control apparatus 17 (e.g., a single lever power controller). The control apparatus 17 includes a processor 30 configured to receive signals indicative of an operator's commanded power output, signals indicative of environmental conditions (e.g., ambient air conditions), and/or signals indicative of various parameters associated with the components of the power generation system 1. Based on these signals, the processor determines one or more control settings for the components of the power generation system 1 for improving or optimizing the efficiency of the hybrid vehicle 110's power generation system 1. For example, the hybrid vehicle 110 may include a processor 30 at least similar to the exemplary processors 30 described previously herein.

Similar to the exemplary embodiments of power generation system 1 of FIGS. 1-5, the exemplary processor 30 of the hybrid vehicle 110 may include one or more single input power controller (SIPC) algorithms as described previously herein. For example, the processor 30 may determine control settings for the components of the power generation system 1, such as, for example, the power source 2, the generator 3, the transmission servo 6, the energy storage device 82, the drive-line transmission 80 (including the one or more electric motors and gear box), the transmission servo 6, the drive-line transmission servo 84, the turbocharger(s), the wastegate valve 18, the wastegate servo 20, the throttle valve 22, the throttle servo 24, the ignition, the air-fuel mixture, the fuel injection timing and/or the amount of fuel injected, and/or the timing and/or duration of the opening and closing of the intake valves and/or exhaust valves of the power source 2. Furthermore, the SIPC algorithm(s) may be in the form of digital information stored in computer software and/or hardware incorporated into the processor 30. The processor 30 may be configured to receive signals indicative of environmental conditions, signals indicative of operating parameters associated with the components of the power generation system 1, and signals indicative of the commanded power output. Based on these signals, the processor 30 performs the SIPC algorithm(s) and outputs control settings for the components of the power generation system 1, for example, at the end of each control cycle. Furthermore, the processor 30 may be configured to allocate mechanical power between the generator 3 and the driveline transmission 80 such that the efficiency of the power generation system 1 is improved or optimized.

Figure 9:
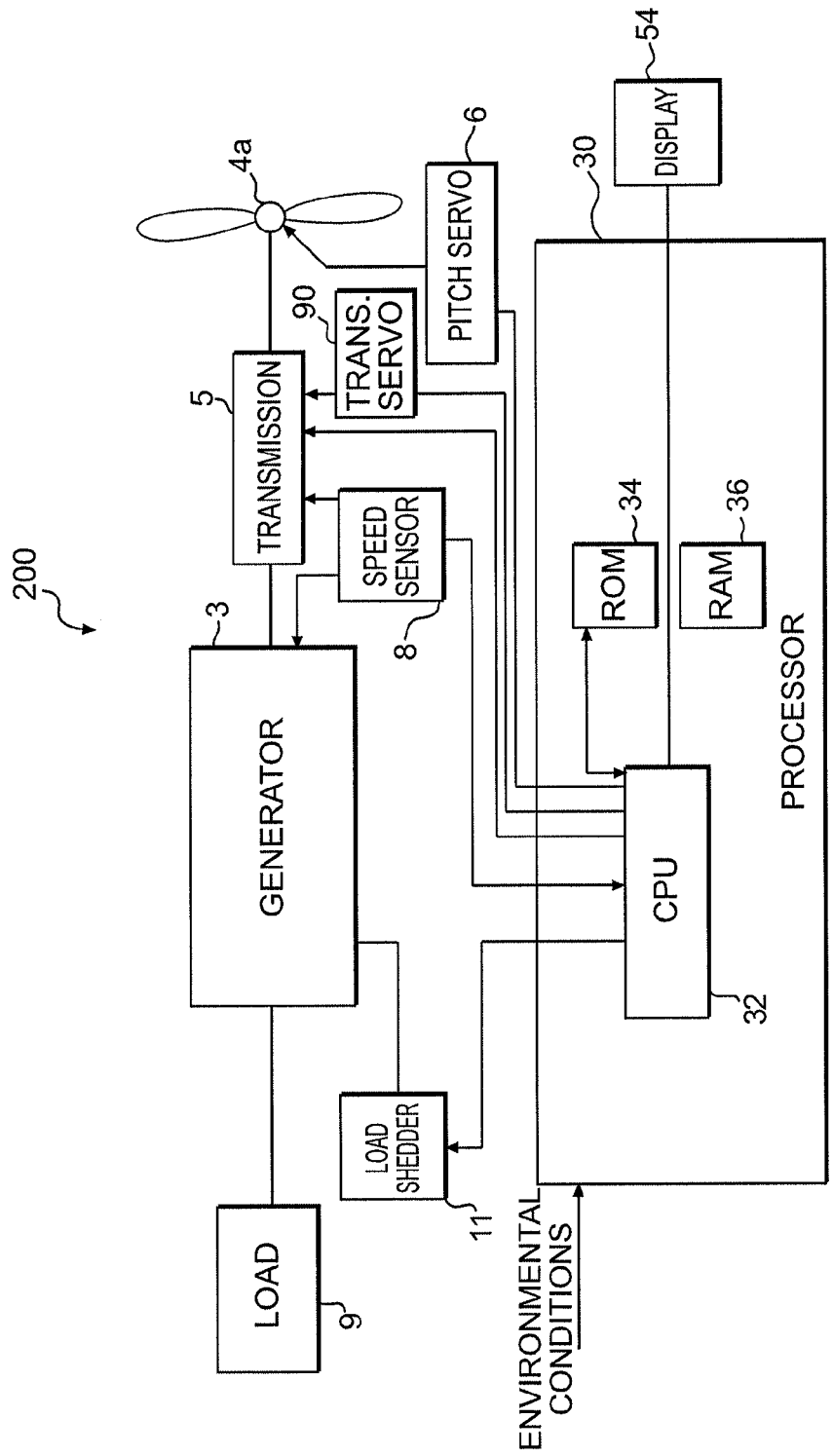
FIG. 9 is a block diagram of an exemplary embodiment of a power generation system.

According to the exemplary embodiment schematically-depicted in FIG. 9, the power generation system 1 may be used to generate electricity using a naturally occurring energy source rather than, for example, an internal combustion engine. According to some embodiments, the power generation system 1 may be configured to use the wind, the sun, the flow of streams and rivers, tidal current, and/or ocean currents to generate electricity. For example, the power generation system 1 shown in FIG. 9 may be configured to generate power using the wind.

For example, a wind turbine produces electrical energy by converting the energy in the wind into rotation of a propeller, which is operably coupled to an electric generator. Wind turbine-powered generators, however, may not always operate at maximum efficiency under changing environmental conditions, for example, during changes in ambient air conditions, such as, for example, the wind velocity, the relative humidity, the temperature, and the barometric pressure.

The exemplary embodiment of power generation system 200 schematically-depicted in FIG. 9 may be configured to operate as a fluid-driven turbine for generating electric power, such as, for example, a wind turbine. According to the exemplary embodiment depicted in FIG. 9, the power generation system 200 includes a propeller 4a operably coupled to a generator 3 via a transmission 5. The wind acts on the propeller 4a such that the propeller rotates, thereby converting the wind into mechanical power that drives the transmission 5, which in turn, rotates the generator 3, which generates electric power. The generated electric power may be stored or used as known via a load 9.

The overall efficiency of the power generation system 200 may be varied by, for example, changing the pitch of the blades of the propeller 4a, changing the gear ratio of the transmission 5 such that the speed of the generator 3 is altered, and/or changing the magnitude of the load 9. For example, as environmental conditions change, changing the pitch of the blades of the propeller 4a may result in improving or optimizing the efficiency of the power generation system 200. Further, changing the effective gear ratio of the transmission 5 may result in changing the speed of the generator 3, which may result in improving or optimizing the efficiency of the power generation system 200. In addition, changing the magnitude of the load 9 via the load shedder 11 may result in improving or optimizing the efficiency of the power generation system 200.

According to some embodiments, the power generation system 200 may include a pitch servo 6 for altering the pitch of the blades of the propeller 4a, a transmission servo 90 for altering the effective ratio of input to output of the transmission 5, and/or a load shedder 11 for altering the electric load experienced by the generator 3. The power generation system 200 may also include various sensors, such as speed sensors for detecting the speed of the transmission 5 and/or the generator, and sensors for detecting environmental conditions. According to some embodiments, the power generation system 1 may include a system (not shown) for orienting a power source, for example, the propeller 4a, solar cells, and a device (e.g., a turbine) for receiving fluid flow from rivers, streams, tides, or ocean currents, to improve or optimize power generation by the power source.

According to the exemplary embodiment depicted in FIG. 9, the power generation system includes a processor 30 similar to the exemplary processors 30 described previously herein. The processor 30 may include a central processing unit 32, read only memory (ROM) 34, and/or random access memory (RAM) 36. The processor 30 is configured to receive signals indicative of the environmental conditions and the operating parameters of the components of the power generation system 200, and determine control settings for operating the power generation system 200 with improved or optimized efficiency. The control settings include, for example, the pitch of the blades of the propeller 4a, which may be altered via pitch servo 6, the effective gear ratio of the transmission 5, which may be altered via the transmission servo 90, and the magnitude of any load shedding via load shedder 11.

For example, signals indicative of the environmental conditions may be received by the processor 30. Based on one or more of the received signals indicative of the environmental conditions, the processor 30 may determine control settings for the pitch of the blades of the propeller 4a, the effective gear ratio transmission 5, and/or the a magnitude of any load shedding via load shedder 11, which may result in improved or optimized efficiency of the power generation system 200. The processor 30 may include look-up tables, maps, and/or mathematical equations (e.g., stored in the ROM 34 and/or RAM 36) for determining improved or optimum control settings based on the signals indicative of the environmental conditions. The processor 30 may generate control signals for the pitch servo 6, transmission servo 90, and/or load shedder 11 to provide improved or optimized efficiency.

According to some embodiments, the processor 30 may initially use experimentally or theoretically-derived values for the look-up tables, maps, and/or mathematical equations to establish base-line control settings. The processor 30 may be configured to regularly monitor operation of the power generation system 200 and adaptively update the base-line control settings by storing control setting that provide improved or optimized efficiency for environmental conditions previously experienced.

It will be apparent to those skilled in the art that various modifications and variations can be made to the structure and methodology described herein. Thus, it should be understood that the invention is not limited to the subject matter discussed in the specification. Rather, the present invention is intended to cover modifications and variations.

What is claimed is:

1. A vehicle comprising:
  at least one propulsion member; and
  a power generation system comprising
    a power source,
    a transmission, and
    a control apparatus comprising
      an input device configured to generate signals indicative of a power output command, and
      a processor
      configured to
        receive signals indicative of
          the power output command, a plurality of detected ambient air conditions, and
a plurality of detected power generation system parameters,
determine a plurality of power generation system control settings for improving efficiency of the vehicle by using look-up tables to interpolate data representative of
the signals indicative of the power output command,
the signals indicative of the plurality of detected ambient air conditions, and
the signals indicative of a plurality of power generation system parameters, and
output a plurality of signals corresponding to the plurality of power generation system control settings,
wherein the plurality of power generation system control settings relate directly to the power source, transmission, and control apparatus, and
adaptively adjust data contained in the look-up tables based on actual performance of the power generation system.

2. The vehicle of claim 1, wherein the detected ambient air conditions comprise at least one of aft pressure, temperature, humidity, and wind velocity.

3. The vehicle of claim 1, wherein the plurality of power generation system control settings comprises control settings for at least one of the power source, the transmission, a transmission servo, at least one turbocharger, a wastegate valve, a wastegate servo, a throttle valve, a throttle servo, an ignition system, a fuel injection system, and a valve train.

4. The vehicle of claim 3, wherein the control settings for the power source comprise power source speed and manifold air pressure.

5. The vehicle of claim 1, wherein the plurality of detected power generation system parameters comprises at least one of power source speed, manifold air pressure, exhaust gas temperature, cylinder head temperature, universal exhaust gas oxygen, air charge temperature, mass airflow, and exhaust pressure.

6. The vehicle of claim 1, wherein the processor is configured to store plural sets of power generation system control settings corresponding to previously detected ambient air conditions and respective power output commands, and to improve the efficiency of the power generation system by selecting one set of the plural sets of power generation system control settings corresponding to the signals indicative of the detected ambient air conditions and the power output command.

7. The vehicle of claim 1, wherein the vehicle comprises one of a hybrid electric vehicle, a fuel-cell powered vehicle, and a battery-powered vehicle.

8. The vehicle of claim 1, wherein the vehicle comprises a hybrid electric vehicle, the power generation system comprises an electric generator, and the transmission is operably associated with the electric generator and the at least one propulsion member.

9. The vehicle of claim 8, wherein the transmission comprises an electric motor.

10. The vehicle of claim 9, wherein the transmission comprises a variable speed transmission, and the control apparatus is configured to optimize the power output efficiency of the power generation system via controlling the variable speed transmission.

11. The vehicle of claim 8, wherein the control apparatus is configured to optimize the power output efficiency of the power generation system via controlling at least one of power source speed, power source load, electric generator speed, and electric generator load.

12. The vehicle of claim 1, wherein the power source comprises at least one of an internal combustion engine, a fuel cell, a solar cell, and a battery.

13. The vehicle of claim 1, wherein the power source comprises at least one of a two-stroke engine, a four-stroke engine, a spark-ignition engine, a compression-ignition engine, a rotary engine, and a gas turbine engine.

14. The vehicle of claim 1, wherein the vehicle comprises one of a car, a truck, a train, a boat, and an airplane.

15. A hybrid electric vehicle comprising:
at least one propulsion member; and
a power generation system comprising
a power source,
an electric generator operably associated with the power source,
a transmission, and
a control apparatus comprising
an input device configured to generate signals indicative of a power output command, and
a processor,
wherein the processor is configured to
receive signals indicative of
the power output command,
a plurality of detected ambient air conditions, and
a plurality of detected power generation system parameters,
determine a plurality of power generation system control settings for improving efficiency of the vehicle by using look-up tables to interpolate data representative of
the signals indicative of the power output command,
the signals indicative of the plurality of detected ambient air conditions, and
the signals indicative of the detected power generation system parameters, and
output a plurality of signals corresponding to the plurality of power generation system control settings,
wherein the plurality of power generation system control settings relate directly to the power source, transmission, and control apparatus, and
adaptively adjust data contained in the look-up tables based on actual performance of the power generation system.

16. The vehicle of claim 15, wherein the detected ambient air conditions comprise at least one of air pressure, temperature, humidity, and wind velocity.

17. The vehicle of claim 15, wherein the plurality of power generation system control settings comprises control settings for at least one of the power source, the transmission, a transmission servo, at least one turbocharger, a wastegate valve, a wastegate servo, a throttle valve, a throttle servo, an ignition system, a fuel injection system, and a valve train.

18. The vehicle of claim 17, wherein the control settings for the power source comprise power source speed and manifold air pressure.

19. The vehicle of claim 15, wherein the plurality of detected power generation system parameters comprises at least one of power source speed, manifold air pressure, exhaust gas temperature, cylinder head temperature, universal exhaust gas oxygen, air charge temperature, mass airflow, and exhaust pressure.

20. The vehicle of claim 15, wherein the processor is configured to store plural sets of power generation system control settings corresponding to previously detected ambient air conditions and respective power output commands, and to improve the efficiency of the power generation system by selecting one set of the plural sets of power generation system control settings corresponding to the signals indicative of the detected ambient air conditions and the power output command.

21. The vehicle of claim 15, wherein the power source is operably associated with the electric generator, and the power source is operably associated with the transmission via the electric generator.

22. The vehicle of claim 15, wherein the power source is operably associated with the transmission and the electric generator via mechanical links.

23. The vehicle of claim 15, wherein the control apparatus is configured to optimize the power output efficiency of the power generation system via controlling at least one of power source speed, power source load, electric generator speed, and electric generator load.

24. The vehicle of claim 15, wherein the transmission comprises a variable speed transmission, and the control apparatus is configured to optimize the power output efficiency via controlling the variable speed transmission.

25. The vehicle of claim 24, wherein the transmission comprises a continuously-variable transmission.

26. The vehicle of claim 25, wherein the transmission comprises at least one electric motor.

27. The vehicle of claim 15, wherein the power source comprises at least one of a two-stroke engine, a four-stroke engine, a spark-ignition engine, a compression-ignition engine, a rotary engine, and a gas turbine engine.

28. The vehicle of claim 15, wherein the vehicle comprises one of a car, a truck, a train, a boat, and an airplane.

29. A method of improving the efficiency of a vehicle comprising a power generation system comprising a power source and a control apparatus, the method comprising:

generating via an input device, a signal indicative of a power output command;

providing to a processor of the control apparatus,
the signal indicative of the power output command,
a plurality of signals indicative of detected ambient air conditions, and
a plurality of signals indicative of detected power generation system parameters;

determining via the processor, a plurality of power generation system control settings by using look-up tables to interpolate data representative of
the signals indicative of the power output command,
the signals indicative of the detected ambient air conditions, and
the signals indicative of the power generation system parameters;

outputting signals indicative of the plurality of power generation system control settings; and controlling operation of the power generation system via the signals indicative of the plurality of power generation system control settings,
wherein the plurality of power generation system control settings relate directly to the power source, and control apparatus, and adaptively adjusting data contained in the look-up tables based on actual performance of the power generation system.

30. The method of claim 29, further comprising adaptively improving the efficiency of the vehicle, comprising
storing plural sets of power generation system control settings corresponding to previously detected ambient air conditions and respective power output commands; and
improving the efficiency of the power generation system via selecting one set of the plural sets of power generation system settings corresponding to the signals indicative of the detected ambient air conditions and the power output command.

* * * * *